Sept. 18, 1956  E. G. LURCOTT, JR  2,763,808
SWITCHING CIRCUIT

Filed May 26, 1953  2 Sheets-Sheet 1

INVENTOR.
Eugene G. Lurcott, Jr.
BY Morris L. Rabkin
ATTORNEY

INVENTOR.
Eugene G. Lurcott, Jr.
BY Morris L. Rabkin
ATTORNEY

United States Patent Office 2,763,808
Patented Sept. 18, 1956

2,763,808

SWITCHING CIRCUIT

Eugene G. Lurcott, Jr., Woodbury, N. J., assignor, by mesne assignments, to the United States of America as represented by the Secretary of the Navy Application May 26, 1953, Serial No. 357,441

9 Claims. (Cl. 315—25)

This invention relates generally to switching circuits, and more particularly to electronically controlled, high speed precision switching circuits of the type used to switch a plurality of D. C. voltages of different magnitudes sequentially and cyclically into a common output. While not specifically, or exclusively, limited thereto, the switching circuit of the present invention is particularly applicable to telemetering, computing, and radar tracking apparatus. The switching circuit of the present invention will be described, for the purpose of illustration, in connection with radar tracking.

In radar tracking systems, and the like, mechanical switching means have been employed in order to switch a relatively small number of signals sequentially and cyclically into a common output. For example, mechanical switches capable of handling 30 signals per second are known. The requirements for speeds in excess of 30 signals per second tend to render mechanical switches impractical because of their physical limitations, and because of their relatively short switch life at relatively higher speeds.

Switching circuits using vacuum tubes are well known in the art, but most of these circuits use a plurality of tubes of each signal switched, thereby increasing the cost of the equipment. Also, some of the less complicated switching circuits of the prior art are too dependent upon tube characteristics to be relied on for the accuracy needed in radar tracking circuits.

It is, therefore, a principal object of the present invention to provide improved apparatus by means of which high speed switching may be accomplished with precision and economy.

It is a further object of the present invention to provide improved switching apparatus by means of which only one tube is used per "switch contact" in cooperation with several tubes which are common to all circuits.

It is still a further object of the present invention to provide improved apparatus by means of which precision stores are used to position a spot on a cathode ray tube for radar tracking purposes.

Another object of the present invention is to provide improved electronic switching apparatus which comprises a plurality of similar circuits each of which lends itself to the construction of a separate plug-in unit.

These and further objects of the present invention are attained in improved switching apparatus comprising, inter alia, a phantastron ring oscillator and a Miller integrator. The phantastron ring oscillator is triggered by incoming synchronizing pulses at a desired repetition rate. The delay of each phantastron circuit in the ring oscillator is determined by the amplitude of a separate signal voltage applied to it from an incoming store. The delay of each phantastron circuit is never allowed to be longer than 50 percent of the time between the synchronizing pulses. The output voltages from the phantastron circuits of the ring oscillator, preferably a positive square wave from the screen grid, are mixed together and used as gates on the Miller integrator type of saw-tooth generator. The output of the saw-tooth generator, then, will consist of saw teeth voltages of equal slope but each with an amplitude governed by the corresponding gate widths. These saw teeth voltages are applied to a capacity store, from which they may be applied to the deflection plates of a cathode ray tube. The capacity store is discharged periodically by each synchronizing pulse just before each saw-tooth voltage starts. Because the maximum width of each output voltage from the phantastron ring oscillator is no longer in time than 50 percent of the time between successive synchronizing pulses, there will be available at the output of the capacity store a D. C. voltage for a minimum of 50 percent of the time which will be directly proportional to the corresponding input signal voltage to the particular phantastron circuit.

In the ring oscillator circuit of the present invention at least two pulses are necessary to trigger the phantastron circuits thereof; namely, a synchronizing pulse and a pulse from a preceding delay circuit. To allow the switching circuit of the present invention to be synchronized with an input circuit, from which the signal voltages are derived, for each complete cycle of the ring oscillator, master synchronization pulses are fed to all but one of the phantastron circuits in the ring oscillator, through a phase splitter, in polarities so as to disable all but the first phantastron circuit.

The novel features of the invention, as well as the invention itself, both as to its organization and method of operation will be understood in detail from the following description, when considered in connection with the accompanying drawings in which, similar reference numerals applying to similar elements, and in which.

Figure 1:
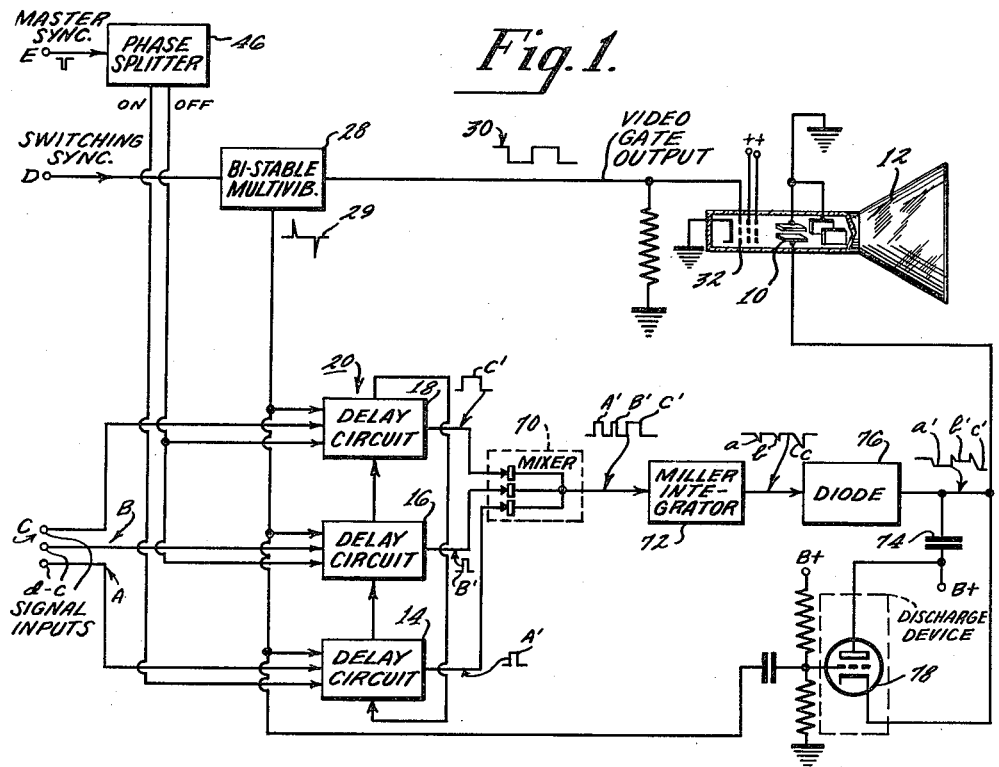
Fig. 1 is a block diagram, partly schematic, of apparatus comprising the switching apparatus, in accordance with the present invention.

Referring now to Fig. 1, there is shown, in block diagram form, apparatus by means of which D. C. signal voltages A, B, C, etc. may be switched sequentially, and cyclically, into a common output, and applied to a pair of deflection plates 10 of a cathode ray tube 12, as in a radar tracking system. The signals A, B, C, etc. may be information voltages or precision stores derived from a radar system for the purpose of positioning a beam on the cathode ray tube 12. The input signals or voltages A, B, C, etc. are applied to phantastron or delay circuits 14, 16, 18, etc., respectively, of a phantastron ring oscillator 20.

Figure 2:
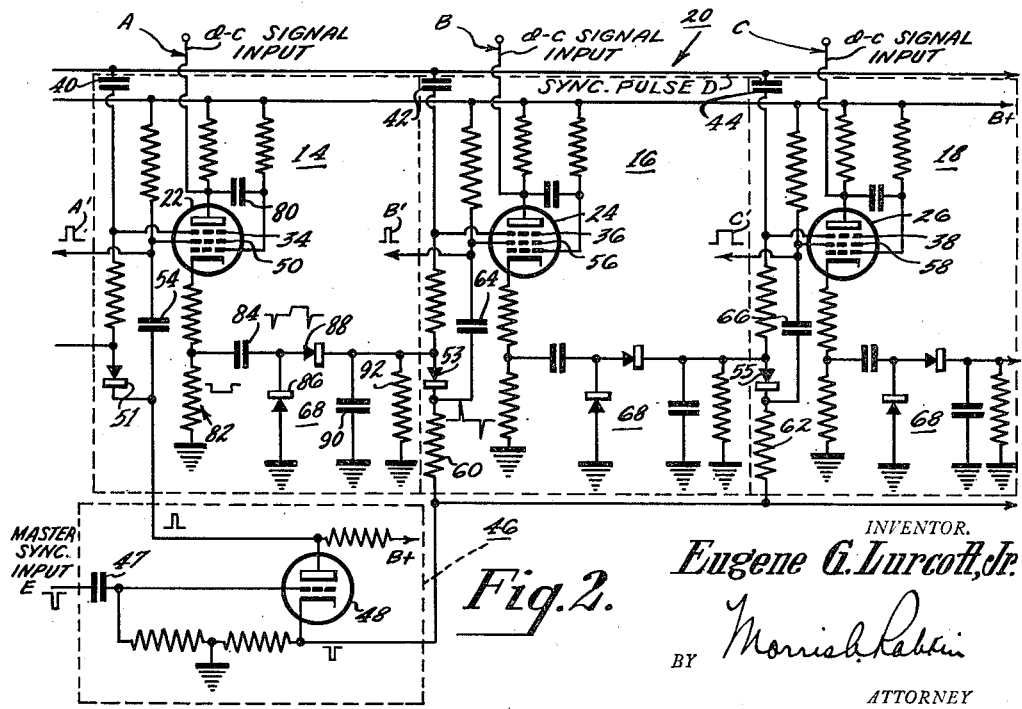
Fig. 2 is a schematic diagram of the delay circuits of the phantastron ring oscillator, Figs. 3 (a) to (h) are representations of wave forms used to explain the switching circuit of the present invention.

Each of the delay circuits 14, 16, 18, etc. comprises a single pentode 22, 24, 26, etc., respectively, as shown in Fig. 2. The input signal voltages A, B, C, etc., are applied to the plates of the tubes 22, 24, 26, etc. The operation of the phantastron ring oscillator 20 will be hereinafter described.

A bistable multivibrator 28, of conventional type, having a differentiated output, voltage shown as wave form 29, is connected to each of the delay circuits 14, 16 and 18 of the phantastron ring oscillator 20 in order to provide a source of recurring, time reference, voltage pulses. The multivibrator 28 may be locked into a source of repetitive, or synchronizing, pulses D derived from the same external circuit from which the signals A, B and C are derived. While the system of the present invention may be used to switch a number of signal voltages far in excess of that possible by mechanical means, the present invention is being described in connection with the switching of the three pulses A, B and C, for illustrative purposes, only and is, therefore, not to be construed in a limiting sense.

A square wave 30 may also be derived from the bistable multivibrator 28, in a manner well known in the art, which is 180° out of phase with the differentiated output 29, and is applied to the control grid 32 of the cathode ray tube 12, for gating purposes.

The differentiated output voltage 29 of the bistable multivibrator 28 is applied to the suppressor grids 34, 36 and 38 of the tubes 22, 24 and 26, respectively, through capacitors 40, 42 and 44, respectively, as shown in Fig. 2.

A master synchronization pulse E is applied to a phase splitter circuit 46 for each cycle of operation of the phantastron ring oscillator 20. Referring now to Fig. 2, the master synchronization pulse E is applied, through a capacitor 47, to the grid of a tube 48, connected in the phase splitting circuit 46. If it is assumed that the master synchronization input pulse E is negative, it is seen that a positive-going pulse may be applied from the plate of the tube 48 to the suppressor grid 34 of the tube 22 through the diode 51. Negative-going pulses, derived from the cathode of the tube 48, are applied to the suppressor grids 36 and 38 of the tubes 24 and 26 through resistors 60 and 62 and the diodes 53 and 55, respectively. With this arrangement, the master synchronization pulse E will enable the tube 22 of the first delay circuit 14, and disable the tubes 24 and 26 of the second and third delay circuits 16 and 18, respectively, at a rate subharmonically related to the occurrence of the synchronizing pulses D.

The first delay circuit 14 is connected to the last delay circuit 18 in order to enable these circuits to operate cyclically as a phantastron ring oscillator. This latter connection (not shown) is from the cathode output of the tube 26, through a cathode coupling circuit 68, to the suppressor grid 34 of the tube 22 in the first delay circuit 14, where the ring oscillator 20 comprises three delay circuits. The delay circuits 14, 16 and 18 are coupled to each other, by coupling the cathode output of one circuit to the suppressor grid of the next circuit by coupling circuits 68.

The output voltages from the screen grids of each of the delay circuits 14, 16 and 18 are fed in sequential order to a mixer circuit 70, for decoupling purposes, and thence to a Miller integrator circuit 72, as shown in Fig. 1. The output of the Miller integrator circuit is applied to a capacitor 74, through a diode 76, for storing purposes. The voltages on the capacitor 74 are applied sequentially across the deflection plates 10 of the cathode ray tube 12.

Means are provided to discharge the capacitor 74 with each synchronizing pulse D. To this end, the differentiated output wave 29 is also applied to the grid of a tube 78 which is normally biased to cut off, but which is rendered conductive with the positive-going pulse of the wave form 29. In this manner, the capacitor 74 is discharged after each of the pulses A, B and C has been applied to the deflecting plates of the cathode ray tube 12.

Figure 3:
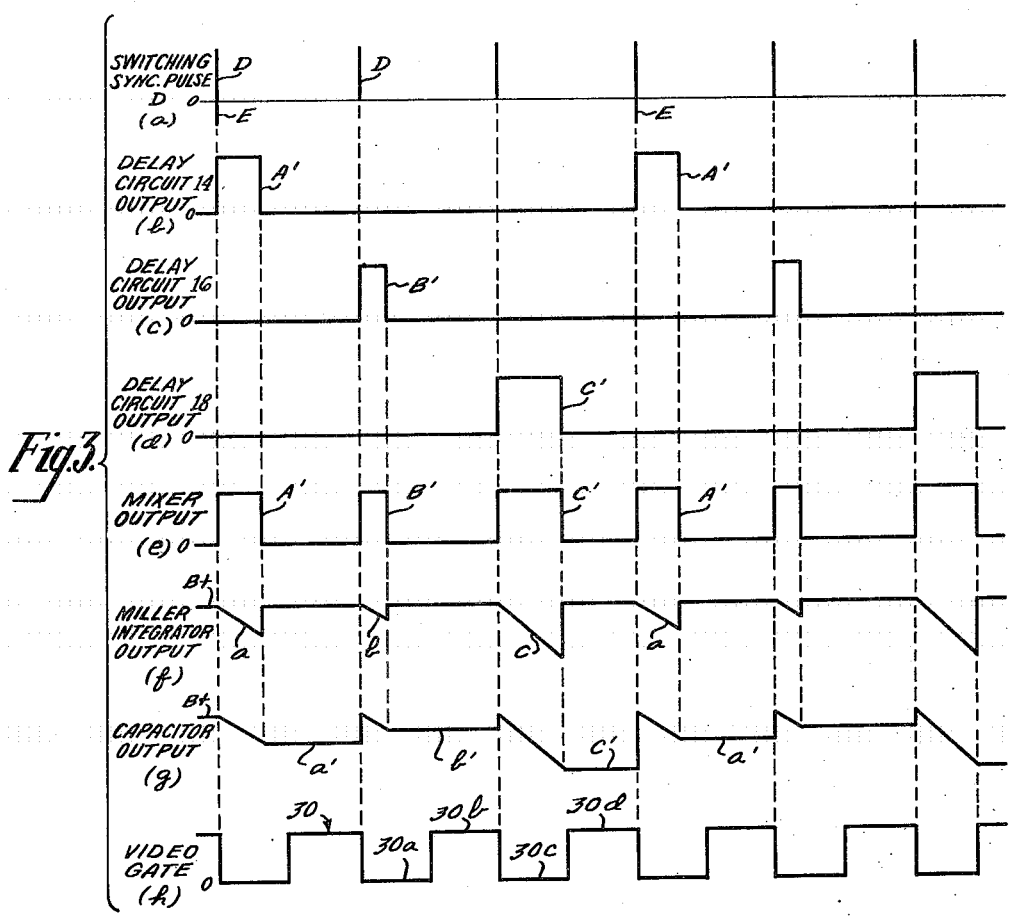

Referring now to Fig. 3, let it be assumed that the signal voltages A, B and C are all derived from some external circuit from which the repetitive synchronizing pulses D, and the master synchronizing pulses E are also derived. The master synchronizing pulse E will be at a subharmonic rate to the synchronizing pulses D. Assume, also, that at the beginning of the cycle the pulses D and E occur at the same time, as shown in Fig. 3A. The master synchronizing pulse E will occur once for every three switching synchronizing pulses D.

In its quiescent state, considering the delay circuit 14 only, the screen grid 50 is drawing heavy current. The suppressor grid 34 is negative with respect to the cathode, and the plate of the tube 22 is at the voltage of the input signal A. In order to render the plate circuit of the tube 22 conductive, the positive differentiated pulse 29 from the bistable multi-vibrator 28 is applied to the suppressor grid 34. Also, the positive signal from the plate of the utbe 48 of the phase splitter circuit 46 renders the suppressor grid 34 more positive. Current will now begin to flow through the plate circuit of the tube 22, and the plate voltage thereof will drop. Since the plate of the tube 22 is connected to the control grid thereof, through a capacitor 80, the control grid voltage will also drop, and the tube current will drop to a very low value. The tube current will then increase at a rate determined by the resistance and capacitance time constant of the circuit until the plate voltage can drop no further. At this point, the control grid will tend to rise, as a result of the discharge of the capacitor 80. This, in turn will tend to make the cathode rise in potential, which, in fact, is the same as decreasing the potential on the suppressor grid 34, and consequently the tube 22 will return to its quiescent state.

As a result of the triggering of the delay circuit 14 by the switching synchronizing pulse D and the positive signal from the phase splitter 46, the delay circuit 14 will produce a square wave output at its screen grid 50. This square wave output, the width of which is proportional to the magnitude of the signal input A, may have the shape shown by the wave form A' in Fig. 3 (b). In a similar manner, the output voltages of the delay circuits 16 and 18 may have the wave forms B', C' at their respective screen grids 56 and 58, as shown in Figs. 3 (c) and (d), respectively. The widths of the square-wave output voltages of the delay circuits of the phantastron ring oscillator 20 are never allowed to exceed more than 50 percent of the time between the synchronizing pulses D. For example, if the time between the synchronizing pulses D is 100 microseconds, the width of the square-wave A', B' or C' will never be allowed to be more than 50 microseconds in width.

The tubes 22, 24 and 26 in the delay circuits 14, 16 and 18 in the ring oscillator 20 are so biased that the synchronizing signal D alone will not be sufficient to trigger them. Each delay circuit requires both a switching synchronizing signal D and a signal derived from a preceding delay circuit in the ring oscillator. This latter pulse is the pulse that is derived from the cathode of the preceding tube. In other words, if 50 volts are required to trigger the tube 24, of the delay circuit 16, for example, about 25 volts is applied to the suppressor grid 36 from the voltage divider 82 in the cathode circuit of the tube 22 through the coupling circuit 68, and the remaining triggering voltage, at least 25 volts is derived from the switching synchronizing pulse D through the capacitor 42.

Each of the coupling circuits 68, between the delay circuits in the phantastron ring oscillator 20, is of the peak to peak rectifier and filter type. It has been found that this type of coupling provides a highly improved means for a much greater degree of accuracy in timing than is provided by the phantastron coupling circuits of the prior art. The coupling circuit 68 comprises a capacitor 84 having one side connected to a tap on the voltage divider 82 in the cathode circuit of the tube 22, and the other side connected to the cathode of a diode 86. The anode of the diode 86 is connected to ground. The cathode of the diode 86 is connected to an anode of a diode 88, and the cathode of the diode 88 is connected to the anode of the diode 53. A capacitor 90, and a resistor 92 connected in parallel with the capacitor 90, are each connected between the cathode of the diode 88 and ground. It will be noted that the coupling circuit 68 couples a low impedance source, the cathode circuit of one delay circuit, to the suppressor grid of the following delay circuit. This coupling arrangement minimizes the load of each of the phantastron circuits and thereby permits a more accurate timing than heretofore known.

Figure 4:
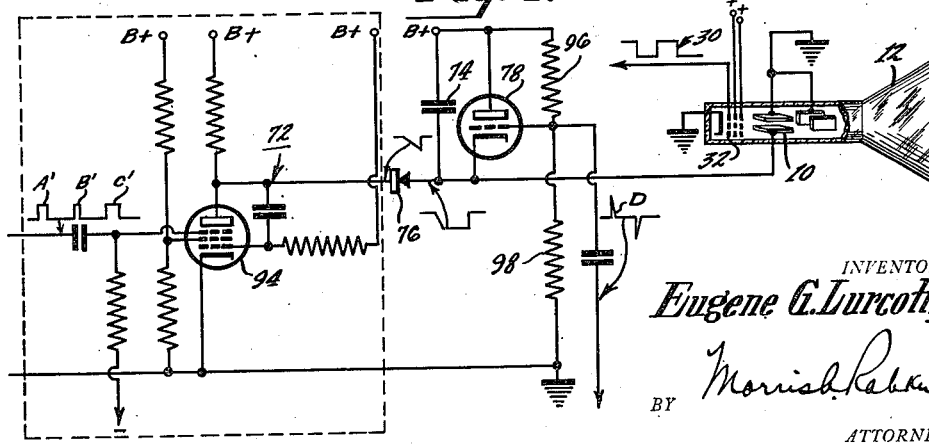
Fig. 4 is a schematic diagram of a portion the block diagram of Fig. 1.

The output pulses A', B' and C' from the mixer 70 are applied to the suppressor grid of a pentode 94 of the Miller integrator circuit 72, as shown in Fig. 4. The Miller integrator circuit 72 is of conventional type and is similar to that described in "Electron-Tube Circuits," by Samuel Seely, published by McGraw-Hill Book Company, New York, New York, 1950. In accordance with the operation of the Miller integrator circuit 72, as is well known in the art, the output voltage at the anode of the tube 94 is a saw-tooth voltage. The slope of the saw-tooth output voltage is the same for any square-wave input to the suppressor grid of the tube 94, but the magnitude of the saw-tooth voltage is proportional to the width of the square wave input, and is 180° out of phase therewith.

Referring now to Fig. 3 (f), there are shown saw-teeth output voltages a, b and c derived from the input voltages A', B' and C' to the Miller integrator circuit 72. The width of any one saw-tooth output of the Miller integrator circuit 72 is never allowed to exceed 50 percent of the time between successive switching synchronizing pulses D. Since the anode of the tube 94 is coupled to one side of the capacitor 74 through the diode 76, it will be understood that the voltage of the capacitor 74 will be charged to the peak voltage of each saw tooth voltage. After the peak of the saw tooth voltage has been reached, the capacitor 74 will maintain this voltage because as the output of the Miller integrator circuit 72 returns to B+ at the end of its saw-tooth cycle, the cathode of diode 76 rises in voltage above its anode. Thus, the diode stops conducting and the only discharge path for capacitor 74 is the leakage resistance. The capacitor 74 will maintain the voltage of the peak of each saw-tooth voltage for at least the latter 50 percent of the time between successive switching synchronizing pulses D, and will be discharged with the beginning of each new saw-tooth voltage, as explained above.

Since the cathode ray tube 12 is enabled by the positive square-waves 30 applied to the grid 32 of the cathode ray tube 12, it is seen that the cathode ray beam of the cathode ray tube 12 will be positioned by the voltages applied sequentially to the deflection plates 10. Referring to Figs. 3 (g) and (h), for example, it can be seen that when the positive portion of the square-wave 30 turns on the beam of the cathode ray tube 12, the voltage applied to the deflection plate 10 will be a'. The cathode ray tube 12 will be disabled by the portion 30a of this video gate. During the positive-going portion 30b of the video gate, the voltage applied to the deflection plate 10 will be that represented by b' in Fig. 3 (g), thereby moving the beam of the cathode ray tube 12 to a new position. In a similar manner, the cathode ray tube is disabled by the portion 30c of the video gate, and enabled by the portion 30d of the video gate when the voltage of the deflection plate 10 will be that represented by the voltage c' in Fig. 3 (g).

Thus, there has been shown and described, in accordance with the present invention, apparatus for switching a plurality of signal voltages sequentially and cyclically into a common output system. Since the apparatus described employs, inter alia, phantastron and Miller integrator circuits, the apparatus is substantially independent of the tube characteristics from the standpoint of accuracy, thereby making the apparatus quite reliable. Also, since the apparatus uses a plurality of circuits many of which are of substantially the same type, these circuits may be constructed as separated plug-in units, thereby simplifying the problem of servicing.

I claim:

1. Apparatus for producing a train of output voltages in a predetermined, cyclical sequence, each of said output voltages being proportional in magnitude to a separate one of a plurality of signal, input voltages, respectively; said apparatus comprising a source of repetitive, switching, synchronizing pulses, a plurality of square-wave output voltage, delay circuits responsive only to at least two separate triggering pulses, a source providing a plurality of signal input voltages, means coupling said signal input voltages from said source of signal, input voltages one to each of said delay circuits to control the delay time of each of said delay circuits as a function of the magnitude of the signal voltage coupled thereto, means coupling said delay circuits to each other in sequence and separately to said first-named source for triggering said delay circuits in sequence each in response to both a separate synchronizing pulse from said first-named source and a pulse from a preceding one of said delay circuits, a second circuit adapted to provide a similarly sloped, saw-tooth, output voltage proportional in magnitude to a square-wave input voltage, means to mix the square-wave output, voltages of said delay circuits, means for connecting said delay circuits to said mixing means, means to connect said mixing means to the input of said second circuit, a capacitor, means to couple the output of said second circuit to said capacitor to charge said capacitor to the peak of each of said saw-tooth output voltages, and means connected to said first-named source to discharge said capacitor with each of said synchronizing pulses.

2. Apparatus for producing a train of output voltages in a predetermined, cyclical sequence, each of said output voltages being proportional in magnitude to a separate one of a plurality of signal, input voltages, respectively; said apparatus comprising a source of repetitive, switching, synchronizing pulses, a plurality of square-wave output voltage, delay circuits responsive only to at least two separate triggering pulses, a source providing a plurality of signal input voltages, means coupling said signal input voltages from said source of signal, input voltages one to each of said delay circuits to control the delay time of each of said delay circuits as a function of the magnitude of the signal voltage coupled thereto, means coupling said delay circuits to each other in sequence and separately to said first-named source for triggering said delay circuits in sequence each in response to both a separate synchronizing pulse from said first-named source and a pulse from a preceding one of said delay circuits, a second circuit providing a similarly sloped, saw-tooth, output voltage proportional in magnitude to a square-wave input voltage, means to mix the square wave output, voltages of said delay circuits, means for connecting said delay circuits to said mixing means, means included in said mixing means to apply said square wave output voltages sequentially from the output thereof, means for connecting said mixing means output to the input of said second circuit, a capacitor, means to couple the output of said second circuit to said capacitor to charge said capacitor to the peak of each of said saw-tooth output voltages, means connected to said first named source to discharge said capacitor with each of said synchronizing pulses, each of said delay circuits comprising an electron tube having at least an anode, a suppressor grid, a screen grid, a control grid and a cathode, a source of reference potential, a voltage divider between said cathode and said source of reference potential, a peak to peak rectifier circuit, and said means coupling said delay circuits to each other comprising means connecting said peak to peak rectifier circuit between a tap on the voltage divider of one delay circuit to the suppressor grid of the succeeding delay circuit.

3. Apparatus for producing a train of output voltages in a predetermined, cyclical sequence, each of said output voltages being proportional in magnitude to a separate one of a plurality of signal, input voltages, respectively; said apparatus comprising a source of repetitive, switching, synchronizing pulses, a plurality of square-wave output voltage, delay circuits responsive only to at least two separate triggering pulses, a source providing a plurality of signal input voltages, means coupling said signal input voltages from said source of signal, input voltages one to each of said delay circuits to control the delay time of each of said delay circuits as a function of the magnitude of the signal voltage coupled thereto, means coupling said delay circuits to each other in sequence and separately to said first-named source for triggering said delay circuits in sequence each in response to both a separate synchronizing pulse from said first-named source and a pulse from a preceding one of said delay circuits, a second circuit adapted to provide a similarly sloped, saw-tooth, output voltage proportional in magnitude to a square-wave input voltage, means to mix the square-wave output, voltages of said delay circuits, means for connecting said delay circuits to said mixing means, means included in said mixing means to apply said square wave output voltages sequentially from the output thereof, means for connecting said mixing means output to the input of said second circuit, a capacitor, means to couple the output of said second circuit to said capacitor to charge said capacitor to the peak of each of said saw-tooth output voltages, means connected to said first-named source to discharge said capacitor with each of said synchronizing pulses, each of said delay circuits comprising an electron tube having at least an anode, a suppressor grid, a screen grid, a control grid and a cathode, a source of reference potential, a voltage divider between said cathode and said source of reference potential, a peak to peak rectifier circuit, said means coupling said delay circuits to each other comprising means connecting said peak to peak rectifier circuit between a tap on the voltage divider of one delay circuit to the suppressor grid of the succeeding delay circuit, and said mixing means comprising a plurality of diodes each having an anode connected to the screen grid of each of said tubes, respectively, and a cathode connected to the input of said second circuit.

4. Apparatus for producing a train of output voltages in a predetermined, cyclical sequence, each of said output voltages being proportional in magnitude to a separate one of a plurality of signal, input voltages, respectively; said apparatus comprising a source of repetitive, switching, synchronizing pulses, a plurality of square-wave output voltage, delay circuits responsive only to at least two separate triggering pulses, a source providing a plurality of signal input voltages, means coupling said signal input voltages from said source of signal, input voltages one to each of said delay circuits to control the delay time of each of said delay circuits as a function of the magnitude of the signal voltage coupled thereto, means coupling said delay circuits to each other in sequence and separately to said first-named source for triggering said delay circuits in sequence each in response to both a separate synchronizing pulse from said first-named source and a pulse from a preceding one of said delay circuits, a second circuit adapted to provide a similarly sloped, saw-tooth, output voltage proportional in magnitude to a square-wave input voltage, means to mix the square-wave output, voltages of said delay circuits, means for connecting said delay circuits to said mixing means, means included in said mixing means to apply said square wave output voltages sequentially from the output thereof, means for connecting said mixing means output to the input of said second circuit, a capacitor, means to couple the output of said second circuit to said capacitor to charge said capacitor to the peak of each of said saw-tooth voltages, means connected to said first-named source to discharge said capacitor with each of said synchronizing pulses, each of said delay circuits comprising an electron tube having at least an anode, a suppressor grid, a screen grid, a control grid and a cathode, a source of reference potential, a voltage divider between said cathode and said source of reference potential, a peak to peak rectifier circuit, said means coupling said delay circuits to each other comprising means connecting said peak to peak rectifier circuit between a tap on the voltage divider of one delay circuit to the suppressor grid of the succeeding delay circuit, and said capacitor discharging means comprising an electron tube having an anode connected to one side of said capacitor, a cathode connected to the other side of said capacitor, and a grid connected to said source, said last-mentioned tube being normally biased to cut-off and adapted to be triggered by each of said synchronizing pulses.

5. Apparatus for producing a train of output voltages in a predetermined, cyclical sequence, each of said output voltages being proportional in magnitude to a separate one of a plurality of signal, input voltages, respectively; said apparatus comprising a source of repetitive, switching synchronizing pulses, a plurality of square-wave output voltage, delay circuits responsive only to at least two separate triggering pulses, a source providing a plurality of signal input voltages, means coupling said signal input voltages from said source of signal, input voltages one to each of said delay circuits to control the delay time of each of said delay circuits as a function of the magnitude of the signal voltage coupled thereto, means coupling said delay circuits to each other in sequence and separately to said first-named source for triggering said delay circuits in sequence each in response to both a separate synchronizing pulse from said first-named source and a pulse from a preceding one of said delay circuits, a second circuit providing a similarly sloped, saw-tooth, output voltage proportional in magnitude to a square-wave input voltage, means to mix the square-wave output voltages of said delay circuits, means for connecting said delay circuits to said mixing means, means included in said mixing means to apply said square wave output voltages sequentially from the output thereof, means for connecting said mixing means output to the input of said second circuit, a capacitor, means to couple the output of said second circuit to said capacitor to charge said capacitor to the peak of each of said saw-tooth output voltages, means connected to said first-named source to discharge said capacitor with each of said synchronizing pulses, each of said delay circuits comprising an electron tube having at least an anode, a suppressor grid, a screen grid, a control grid and a cathode, a source of reference potential, a voltage divider between said cathode and said source of reference potential, a peak to peak rectifier circuit, said means coupling said delay circuits to each other comprising means connecting said peak to peak rectifier circuit between a tap on the voltage divider of one delay circuit to the suppressor grid of the succeeding delay circuit, a source of repetitive master pulses, said master pulses being repetitive at a rate subharmonically related to the occurrence of pulses from said first-named source, and means to apply said master pulses to said delay circuits to disable all but one of said delay circuits.

6. In apparatus for positioning a cathode ray beam of a cathode ray tube in accordance with a train of output voltages in a predetermined, cyclical sequence, each of said output voltages being proportional in magnitude to a separate one of a plurality of signal, input voltages, respectively; a source of repetitive, switching, synchronizing pulses, a ring oscillator comprising a plurality of square-wave, output voltage delay circuits and means coupling said circuits to each other in sequence, means to apply said synchronizing pulses separately to each of said circuits, each of said circuits comprising means to provide a triggering voltage which in combination with one of said synchronizing pulses only is sufficient to trigger a succeeding circuit, a source of signal, input voltages, means to couple a separate one of said signal voltages from said source thereof to each of said circuits, respectively, to control the delay time of the square-wave output of said circuits as a function of the signal voltage applied thereto, a second circuit adapted to provide a saw-tooth, output voltage proportional to a square-wave, input voltage, means connected to said delay circuits to mix the square-wave, output voltages from said delay circuits, means connecting said last-named means to said second circuit, a capacitor, means to apply the peak voltage of each saw-tooth, output voltage from said second circuit across said capacitor, means connected across said capacitor to discharge said capacitor with each of said synchronizing pulses, a cathode ray tube, said cathode ray tube comprising at least a grid and a pair of deflection plates, means connecting said capacitor to said plates to apply the voltages across said capacitor to said plates, said first-named source comprising means to provide a train of pulses 180° out of phase with said synchronizing pulses, and means connecting said first-named source to said grid to enable said tube periodically by said train of pulses.

7. In apparatus for positioning a cathode ray beam of a cathode ray tube in accordance with a train of output voltages in a predetermined, cyclical sequence, each of said output voltages being proportional in magnitude to a separate one of a plurality of signal, input voltages, respectively; a source of repetitive, switching, synchronizing pulses, a ring oscillator comprising a plurality of square-wave, output voltage delay circuits and means coupling said circuit to each other in sequence, means to apply said synchronizing pulses separately to each of said circuits, each of said circuits comprising means to provide a triggering voltage which in combination with one of said synchronizing pulses only is sufficient to trigger a succeeding circuit, a source of signal, input voltages, means to couple a separate one of said signal voltages from said source thereof to each of said circuits, respectively, to control the delay time of the square wave output of said circuits as a function of the signal voltage applied thereto, a second circuit providing a saw-tooth, output voltage proportional to a square-wave, input voltage, means connected to said delay circuits to mix the square-wave, output voltages from said delay circuits, means for connecting said mixing means to said second circuit whereby said square-wave output voltages are applied sequentially to said second circuit, a capacitor, means to apply the peak voltage of each saw-tooth, output voltage from said second circuit across said capacitor, means connected across said capacitor to discharge said capacitor with each of said synchronizing pulses, a cathode ray tube, said cathode ray tube comprising at least a grid and a pair of deflection plates, means connecting said capacitor to said plates to apply the voltages across said capacitor to said plates, said first-named source comprising means to provide a train of pulses 180° out of phase with said synchronizing pulses, means connecting said first-named source to said grid to enable said tube periodically by said train of pulses, each of said delay circuits comprising an electron tube having an anode, a suppressor grid, a screen grid, a control grid, and a cathode, a point of reference potential, a voltage divider between said cathode and said point of reference potential, a peak to peak rectifier circuit, said means coupling said delay circuits to each other comprising means connecting said rectifier circuit between a tap on the voltage divider in one of said delay circuits to the suppressor grid of the succeeding delay circuit.

8. In apparatus for positioning a cathode ray beam of a cathode ray tube in accordance with a train of output voltages in a predetermined, cyclical sequence, each of said output voltages being proportional in magnitude to a separate one of a plurality of signal, input voltages, respectively; a source of repetitive, switching, synchronizing pulses, a ring oscillator comprising a plurality of square wave, output voltage delay circuits and means coupling said circuits to each other in sequence, means to apply said synchronizing pulses from said source thereof separately to each of said circuits, each of said circuits comprising means to provide a triggering voltage which in combination with one of said synchronizing pulses only is sufficient to trigger a succeeding circuit, means to couple a separate one of said signal voltages to each of said circuits, respectively, to control the delay time of the square wave output of said circuits as a function of the signal voltage applied thereto, a second circuit which provides a saw-tooth, output voltage proportional to a square-wave, input voltage, means the inputs of which are connected to said delay circuits and the outputs of which are connected to said second circuit to mix the square-wave, output voltages from said delay circuits and to apply them sequentially to said second circuit, a capacitor, means to apply the peak voltage of each saw-tooth, output voltage from said second circuit across said capacitor, means connected across said capacitor to discharge said capacitor with each of said synchronizing pulses, a cathode ray tube, said cathode ray tube comprising at least a grid and a pair of deflection plates, means connecting said capacitor to said plates to apply the voltages across said capacitor to said plates, said first-named source comprising means to provide a train of pulses 180° out of phase with said synchronizing pulses, means connecting said first-named source to said grid to enable said tube periodically by said train of pulses, and said means to discharge said capacitor comprising an electron tube normally biased to cut-off connected across said capacitor and adapted to be triggered by each synchronizing pulse.

9. In apparatus for positioning a cathode ray beam of a cathode ray tube in accordance with a train of output voltages in a predetermined, cyclical sequence, each of said output voltages being proportional in magnitude to a separate one of a plurality of signal, input voltages, respectively; a source of repetitive, switching, synchronizing pulses, a ring oscillator comprising a plurality of square wave, output voltage delay circuits and means coupling said circuits to each other in sequence, means to apply said synchronizing pulses separately to each of said circuits, each of said circuits comprising means to provide a triggering voltage which in combination with one of said synchronizing pulses only is sufficient to trigger a succeeding circuit, means to couple a separate one of said signal voltages from said source thereof to each of said circuits, respectively, to control the delay time of the square wave output of said circuits as a function of the signal voltage applied thereto, a second circuit adapted to provide a saw-tooth, output voltage proportional to a square-wave, input voltage, means the inputs of which are connected to said delay circuits and the outputs of which are connected to said second circuit to mix the square-wave, output voltages from said delay circuits and to apply them sequentially to said second circuit, a capacitor, means to apply the peak voltage of each saw-tooth, output voltage from said second circuit across said capacitor, means connected across said capacitor to discharge said capacitor with each of said synchronizing pulses, a cathode ray tube, said cathode ray tube comprising at least a grid and a pair of deflection plates, means connecting said capacitor to said plates to apply the voltages across said capacitor to said plates, said first-mentioned source comprising means to provide a train of pulses 180° out of phase with said synchronizing pulses, means connecting said source to said grid to enable said tube periodically by said train of pulses, a second source of repetitive master pulses of a frequency subharmonically related to the occurrence of pulses from said first-mentioned source, and means connecting said second source to each delay circuit to disable all but one of said delay circuits by said master pulses.

References Cited in the file of this patent
UNITED STATES PATENTS

| | | |
|---|---|---|
| Re. 22,672 | Shumard | Aug. 28, 1945 |
| 2,405,231 | Newhouse | Aug. 6, 1946 |
| 2,465,355 | Cook | Mar. 29, 1949 |
| 2,593,452 | Hoeppner | Apr. 22, 1952 |
| 2,653,232 | Siglin | Sept. 22, 1953 |